Feb. 11, 1969  R. L. MARKWOOD  3,426,982
VERTIPLANE VTOL AIRCRAFT
Filed Feb. 3, 1967  Sheet _1_ of 5

Ronald L. Markwood
INVENTOR.

Ronald L. Markwood
INVENTOR.

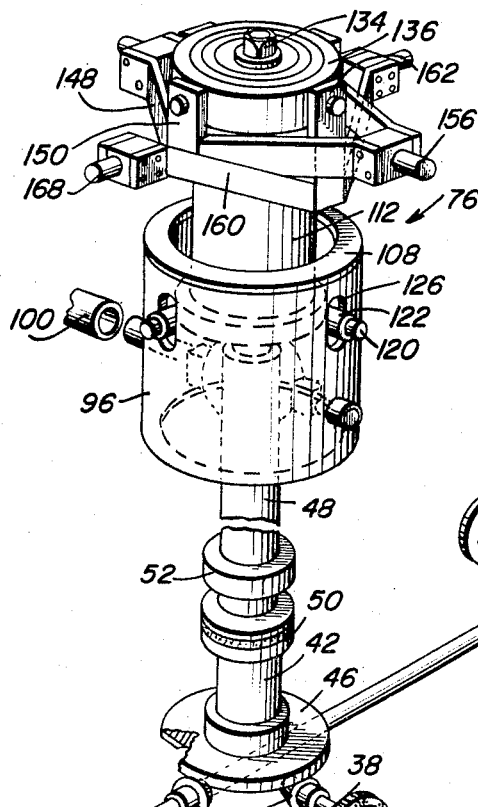
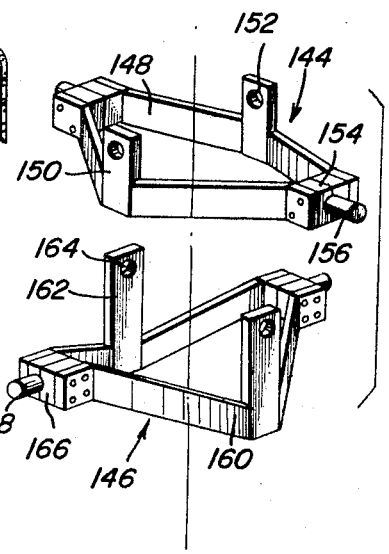
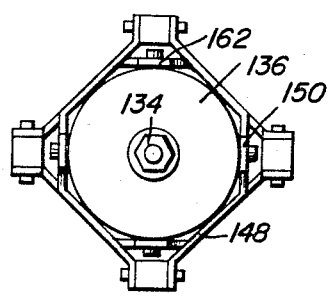

Ronald L. Markwood
INVENTOR.

Feb. 11, 1969 R. L. MARKWOOD 3,426,982
VERTIPLANE VTOL AIRCRAFT
Filed Feb. 3, 1967

Ronald L. Markwood
INVENTOR.

United States Patent Office 3,426,982
Patented Feb. 11, 1969

3,426,982
VERTIPLANE VTOL AIRCRAFT
Ronald L. Markwood, 215 S. Juliana St.,
Bedford, Pa. 15522
Filed Feb. 3, 1967, Ser. No. 613,843
U.S. Cl. 244—7                               15 Claims
Int. Cl. B64c 27/28, 27/82

ABSTRACT OF THE DISCLOSURE

An aircraft of the type capable of vertical take-off and landing and horizontal flight incorporating a rotor having radial blades which aerodynamically operate as rotating wings and a pair of anti-torque propellers which are convertible from a position where the anti-torque propellers serve not only to counteract and neutralize the torque of the rotor but also to add lift to that of the rotor during take-off and landing and providing horizontal propulsion when the aircraft is in horizontal flight by altering the axes of rotation of the anti-torque propellers from a generally vertical orientation to a generally horizontal orientation. The rotor and hub therefore is extremely simple in construction in that the blades thereof are floating insofar as cyclic pitch control and other conventional controls normally provided on helicopters which introduces many advantages as to cost, weight, maintenance and the like. The anti-torque propellers provide supportive lift correct torque, provide rotational attitude control and form the prime means for forward propulsion during horizontal flight.

---

The present invention generally relates to an aircraft capable of vertical take-off and landing and including convertible propeller assemblies and a main rotor in which the propeller assemblies serve as anti-torque devices in both of their positions and provide supportive lift in one position and horizontal propelling thrust when in the other position.

Rotary wing aircraft, frequently referred to as helicopters, have been developed and may be satisfactorily employed under some circumstances. Basically, conventional helicopters or rotary wing aircraft employs rotating wings or blades for generating lift. As such blades are driven, torque causes the craft fuselage to rotate in the opposite direction. In order to compensate for this reaction, variable pitch propellers have been employed whose thrust can be varied to offset the variance in rotor torque caused by aerodynamic imbalances and control changes such as collective pitch, cyclic pitch, etc.

The power used for anti-torque correction is wasted as it is not employed for vertical lift or propulsion and this loss is consistent under all flight conditions. Also, the anti-torque tail rotor causes additional power loss due to additional drag and the necessity of tilting the main rotor slightly to one side to compensate for lateral push created by the tail rotor. Inasmuch as this tilt of the main rotor to achieve compensating lateral thrust does not add supportive lift or thrust in the direction of flight, it also subtracts from the craft's efficiency. In addition, the tilting of the rotor disk laterally complicates the problem of vertical pitch control since it requires higher angles of attack for the rotor blades thereby limiting the available directional control response and inducing certain dissymmetries in addition to those attributable to forward flight.

As is well-known, the anti-torque tail rotor or propeller pitch must be constantly varied by the pilot in order to correct for directional oscillation caused by change in throttle settings, change in cyclic pitch, change in collective pitch, and cross-air currents which occurs since the anti-torque propeller's correcting thrust is in relation to the relative air passing through the blade. Thus, an increase in the velocity of the air passing through the blade as in a cross-gust, causes the tail to skew in the direction of the gust until the pilot feels the change in direction and corrects with an increase in prop pitch. As the gust or relative air slows, the pitch must be decreased or the tail skews in the opposite direction thus creating a directional instability known as fishtailing. Also, the directional control is dependent on the tail rotor in the event of power failure thus requiring that the tail rotor be powered even in the event of power failure. The necessary power to rotate the tail rotor is of course supplied from the main rotor in auto-rotation in the event of a power failure at a time when all lift and latent energy in the form of rotor r.p.m., gained by descent, is needed to slow the rate of descent to a minimum. Inasmuch as auto-rotation landings are, in effect, crash landings at relatively high rates of descent, any reduction in the rotational speed of the rotor which would be caused by power applied to the tail rotor will obviously increased the rate of descent during an auto-rotation landing thus increasing the dangers involved therein.

Another problem in present-day helicopters is the dissymmetry of lift provided by the rotor due to the blades of the helicopter rotating in a circle and the fact that the craft in forward flight follows a straight line causing the blades on one side of the craft to advance in the same direction as the line of flight and the blades on the opposite side of the craft retreat from the direction of flight. Thus, the advancing blades generate more lift since their speed and the craft's speed in the relative air are additive. However, the air speed of the craft must be subtracted from the retreating blade speed in relative air. As forward velocity increases, lift continues to increase on the advancing blades while decreasing on the retreating blades thereby tending to roll and turn the craft in somewhat the same manner as a boomerang. This dissymmetry of lift is solved by what is commonly referred to in present-day helicopters as cyclic pitch which basically is a cam system to selectively alter the angle of attack of each blade. Thus, the advancing blades angle of attack is decreased to destroy lift while the retreating blades angle of attack is increased to create rotor lift in an effort to reach a balance of lift. By being able to alter the angle of attack of each blade throughout 360° of travel, lift can be increased or decreased at any part of the rotor circle to provide longitudinal or lateral control. By increasing the angle of attack and thereby lift of the blades in the aft position and at the same time decreasing the fore blade's lift, an unstable lift condition can be purposely introduced which gives the rotor lift vector a forward horizontal component and propels the craft forward. Applying this dissymmetry of lift at any given area about the rotor disk will result in movement in the opposite direction.

While this control method is operative, it is quite unstable in that a very slight variation in the control pressure and rotor imbalance will case the helicopter to move in a particular direction thus requiring all controls to be adjusted. It is absolutely necessary to maintain control of the cyclic pitch at all times. In addition, the sudden changes in the angle of attack of the rotor blades in flight induce various stresses in the blade due to torque, structural and low frequency vibration forces and other factors which must be relieved with the blades and hub parts having a very short useful life and requiring these components to be replaced rather frequently. The rotor hub structure becomes quite complicated since all controls to the blades, both cyclic and collective pitch must connect to a rapidly rotating hub and blade. Lubrication problems and bearing problems are also quite complicated in view of the extreme loads, vibratory pounding and short arcs of rotation which cause bearing wear, galling, brinelling and fretting corrosion thus reducing the bearing life and requiring frequent replacement. In addition, the cyclic use of blades for forward propulsion is rather inefficient especially as the speed increases. The angle of attack can be increased only so far before the stall angle is reached. This limits the maximum forward thrust component that can be obtained, and most of this component is produced by approximately one-fourth of the total disk area. The high angles of attack require that the profile be greatly increased thus increasing the rotor drag and requiring more horsepower and causing a decay of the lift-drag ratio.

Inasmuch as the angle of attack must be continually increased on the retreating blade, and decreased on the advancing blade to avoid dissymmetry of lift in forward flight, a point is reached as the craft's speed increases where zero lift occurs on the advancing blade and the stall angle is approached on the retreating blade. These two decaying situations do not occur on the two opposing blades at the same time and this results in an inequality of lift that cannot be corrected since any further increase of the angle of attack would stall the blade thus causing complete loss of lift and result in an uncontrollable rolling moment that cannot be correct. This is due to the fact that the corrective lift would have to come from the blades already stalled and this factor is one of the limiting factors in the presently attainable speed of helicopters.

Also, present-day helicopters require an uncontrollable rolling moment at high speed if the rotor blades responsible for the correction of lateral dissymmetry in lift have approached the stall angle of attack, and a directional control maneuver is required which would further increase the angle of attack to obtain greater lift for a directional component of thrust. This maneuver, rather than effecting the desired directional or attitude change, would stall the blades causing them to lose all lift and causing the helicopter to roll in the opposite direction of the desired maneuver. Efforts to gain additional correcting lift, which would be necessary to correct the condition, would further preclude the chance of recovery from this uncontrollable, self-generating rolling moment.

By using the cyclic pitch to create the dissymmetry of lift and thereby tilt the motor disk for forward propulsion, the fuselage of the aircraft also tilts in the direction of flight. Since the angle of the fuselage varies with the power setting, control stick forces, relative air speed and the like, it is almost impossible to determine the attitude of the craft by instruments such as an artificial horizon. This substantially eliminates the possibility of instrument flying of helicopter and the nose-down attitude is also rather uncomfortable to passengers and presents a problem in seating.

Conventional helicopters also employ collective pitch control which permits the angle of attacks of all of the main rotor blades to be increased or decreased while they still maintain their relative cyclic pitch relation and this is used to add or subtract lift rapidly for take-off, climbing, descending, landing and other maneuvers. If a power failure occurs at a relative high collective pitch and at a low altitude, the blades stall so rapidly that pilot reaction time is usually too slow to correct the situation and as the blades stall and the rotor slows rapidly, the helicopter will drop and crash before enough rotor speed can be gained back by descent for auto-rotation and flare-out.

Also, the use of collective pitch in high speed maneuvers can result in loss of control. At high speed, the cyclic pitch has the angle of attack at the rotor blades substantially at their maximum to compensate for dissymmetry of lift and for maximum forward thrust. In this situation, any addition to the angle of attack would result in stalling of these blades and their complete loss of lift. Thus, if the collective pitch is used under these conditions, the blades with the highest angle of attack which are responsible for forward thrust and correction of lateral dissymmetries in lift, will stall first, lose lift and the craft will roll in that direction. Since the blades are already stalled additional lift cannot be created by the cyclic pitch to correct the rolling condition, and the use of a cyclic pitch in this condition will usually worsen the stall, which produces an unrecoverable situation. Further, the collective pitch forces all of the rotor blades to work at higher and less efficient angles of attack especially those blades which are already at high angles of attack due to cyclic pitch. This loss of efficiency is due to deterioration of the lift-drag ratio as the attack angle is increased thus requiring more and more horsepower with less and less lift in return. It is well known that helicopters employ engines of much higher horsepower than comparable fixed wing aircraft and even with the higher horsepower engines, less load capability is produced.

The present invention involves the provision of an aircraft which is capable of taking off either vertically or on runway type take-offs during forward movement. For runway type take-off, the craft can proceed down the runway on the thrust of its horizontally positioned propellers until forward speed gyrates or auto-rotates the free wheeling rotor fast enough to produce the needed lift to achieve flight as in a conventional fixed wing aircraft. For STOL take-off, the props are still in their horizontal position but the rotor clutch is engaged and the roter is rotated at an increasing speed until lift off due to the rotor action is almost achieved. The clutch to the rotor is then disengaged and full throttle applied to the propellers. The stored inertia of the rapidly rotating rotor now permits the craft to lift off after a very short run. The VTOL flight regime requires that the propellers be orientated in a vertical position with the axis of rotation thereof tilted in the direction and angle for torque correction with the thrust of the props and torque produced by the rotor being purposely balanced by choice of prop pitch, r.p.m. and angle of anti-torque thrust. Since power will be absorbed in the same proportions for both rotor and props, anti-torque correction will equal rotor torque regardless of power setting, thereby freeing the pilot from this control, except when directional control is expressly desired.

As the props reach the vertical position and achieve the proper anti-torque thrust angle, the clutch to the rotor is engaged and the craft is then ready for vertical take-off. The throttle is increased to full power and the clutch slowly engaged until lift off occurs and a few feet of altitude obtained. The control stick is then pushed forward which orients the fore and aft position rotor blades momentarily to pivot about the axis of their hinge connection to the rotor hub since they will attempt to remain in their original plane of rotation. However, the blades quickly react to the centrifugal and aerodynamic forces and stabilize in a plane in which their common tip path plane is at right angles to the drive shaft. The rotor disk has now assumed the forward tilt and therefore a forward horizontal component of thrust is created which propels the craft forward, accelerating and climbing in that direction. As forward speed increases, the rotor requires less and less horsepower for the same lift and when desired speed is attained, the throttle may be slightly reduced and the props then rapidly changed to their horizontal position which may automatically release the clutch engaging the rotor to the power source. Under this condition, the craft now proceeds by being pushed or pulled through the air by the propellers with the rotor being allowed to auto-gyrate and thus act somewhat as a parasol-type wing. Aerodynamic rudders disposed in the flow path of the propellers are quite effective for directional control due to the prop blast and the forward speeds. To land, the process is reversed in that the throttle is reduced and the props converted to their vertical anti-torque position and the rotor engaged. The throttle is increased or decreased to establish the desired rate of descent. Hover, rotation, lateral, forward or reverse movement can be accomplished over the landing site and the craft can be lowered easily by slowly reducing the throttle or by slipping the rotor clutch while keeping the engine r.p.m. constant for a faster response at low altitudes inasmuch as the engine will be rotating at the desired maximum speed which gives it the desired torque capacity for enabling instant response to control changes which eliminates any lag which would occur were the engine speed at a minimum.

The rotor employed in the present invention may be termed a floating rotor and is optionally driven or autorotational and employs a structure in the hub thereof which enables relative tilting of the blade assemblies in relation to the rotational axis of the drive shaft. The blade assembly basically includes two rotor blades which are joined rigidly together with the rotor blade spars being fixed at a prescribed angle of attack and they cannot rotate or be withdrawn from the hub by aerodynamic or centrifugal forces. The arrangement permits the blades and hub assembly to pivot or teeter freely only longitudinally about the axis of the hinge pin. The two blade assemblies lie in the same plane 90° apart and both assemblies are free to teeter or pivot at their hub about their respective hinge pins on a universal joint which maintains the constant velocity relation between the drive shaft and the tiltable outer race of the universal joint which can be tilted about a virtual center located at the exact center of the joint.

During hover in still air with the controls in neutral position, all four blades have the same lift since all have the same fixed angle of attack, lift, drag ratio and the same velocity in relative air. Since the anti-torque propellers neutralize the rotor torque automatically, and centrifugal force on the rotor tends to keep or return the freely teetering blades to a plane at right angles to the drive shaft, the craft will maintain a stable attitude. Side gusts of wind will have little effect in hover since the vertically orientated anti-torque props and their thrusts do not sense change in laterally moving relative air as a tail rotor would and therefore, no rotational skewing will take place and no corrective action will be necessary. As a cross gust of wind strikes the rotor, the rotating blades teeter momentarily due to the induced area of dynamic imbalance, but rapidly stabilize themselves automatically due to centrifugal and gyroscopic forces which will act on the tilted blades to restore them to a plane of rotation at right angles to the shaft about which they are rotating, aerodynamic forces which act on the tilting blades increasing the lift on the lower blades and decreasing the lift on the upper which imbalance also forces the blade to level and stabilize in order to neutralize this dissymmetry in lift, and the pendulum effect of the low center of gravity causes the craft itself to have a low frequency as related to the rotor blades which can react rapidly to imbalances whereby the craft itself acts as a damper and aids in the stabilization of imbalances.

In addition to cancelling the rotor torque, the anti-torque propellers enhance and supplement the rotor blades lift and efficiency. The propellers in vertical anti-torque position, draw air down through the rotor which, in effect, results in a relative decreasing of the rotor blades angle of attack in relation to relative air. Since the rotor blades are already operating at higher and less efficient angles of attack, they will, therefore, gain in lift-drag ratio as they pass through the propeller air stream. In the four bladed rotor, two of the blades are always in the propeller affected area. The propellers also achieve this beneficial effect in an area of the rotor blade disk area which is usually quite inefficient.

The rotor action during slow VTOL regime employs the propellers in a vertical anti-torque tilt position and the rotor clutch engaged and driven by the power train with the rudder controls engaged with a differential torque control for rotational directional control. To effect forward, backward, lateral or rotational movement a horizontal vector of thrust is introduced by angling the outer race of the universal joint upon which the two blade and teeter hub assemblies are pivoted or in lieu of this, the drive shaft may be angled. The angling takes place at a constant velocity universal joint and the control system is so connected that the change in angle is in the same direction as the control stick is removed. The outer support housings and the gimbals are arranged so that rotational torque developed along the axis of the support tube, does not make itself felt in the controls.

As the control stick is pushed forward while hovering, the outer race of the hub also tilts forward a proportional number of degrees. The blades which at that instant are in the fore and aft positions momentarily attempt to remain in their original plane of rotational, the fore blade teetering up and the aft blade down. The blades in the lateral position at that instance do not flap because they are in their original plane of rotation but since the tilting of the outer race of the universal joint has also inclined the lateral blades hinge axis. The laterally positioned blades now produce a forward vector of thrust as well as a supporting vector of thrust and the craft will now start accelerating in a forward direction. The fore and aft blades after momentary flapping in relation to the drive shaft will rapidly stabilize themselves to a plane at right angles to the axis of rotation on the outer race of the universal joint and will now also add a forward component of thrust as well as lift. This phenomena of the floating rotor permits the smooth acceleration, starting positively but slowly and accelerating gradually, rather than the unstable conditions encountered in a conventional helicopter.

As forward velocity of the craft increases, the advancing lateral blade is moving faster in relative air than is the retreating lateral blade and therefore, the advancing blade now generates more lift. This dissymmetry of lift is compensated by the lateral blades, by a teetering or flapping of the entire blade hub assembly. The advancing blade with more lift flaps upwardly thus forcing the opposite retreating blade downward. This flapping is only momentary since in rotation the blade soon comes to the fore and aft position where no dissymmetry of lift exists. Several forces tend to automatically reduce or minimize the flapping during the lateral passage of the blades. The upward movement of the advancing blade with the greatest lift changes the angular relation of the relative air and the angle of attack of the blade. In effect, the angle of attack thus decreasing the lift of the blade. The upward flapping of the advancing blade also depresses the opposite retreating blade. The downward movement of the retreating blade thus increases its angle of attack in relation to the relative air thereby generating more lift. Thus, the flapping of the blade assembly automatically diminishes the lift on the blade with the excess lift and increases the lift proportionately on the opposite blade which has less lift. This explanation of flapping to equalize dissymmetry of lift also applies basically to momentary imbalances such as gusts of wind, acceleration, transitional flight, periods between control adjustments and the like before the rotor has had a chance to stabilize. Further, the flapping is normally cancelled by the movement of the control stick itself.

The rotor blades angle of attack is so constructed that as the rotor is tilted forward for forward flight, the fore and aft blades flap momentarily to relieve themselves of gyroscopic forces. However, the lateral blades because of their teeter hinge axis must tilt forward with the change in angle of the outer race of the universal joint or drive shaft which tilt automatically increases the angle of attack of the retreating blade and decreases the angle of attack of the advancing blade. The precise angle of attack for the blades is selected so that the lift gained by the one would equal the lift lost by the other thereby equalizing the dissymmetry of lift in forward flight. This equality of lift and cancellation of flapping can be accomplished by tilting the rotor farther forward as the craft's velocity increases.

This angle of attack for the blades permits this equalizing of lift to continue to extremely high speeds. Also, zero lift on the retreating blade is designed to occur simultaneously with blade stall on the advancing blade. Therefore, control can be maintained at high speed above that obtainable by conventional helicopters is possible with the floating rotor system and propellers for propulsion.

After a reasonable altitude and velocity is reached, the rotor is disengaged and the propellers lowered to their horizontal position for normal flight. The rotor now auto-rotates the blades to produce lift as the craft is pulled or pushed through the air by its high speed propellers. The aircraft will now fly and handle similar to a conventional high wing aircraft with rotor tilting being used for directional control. The rotor acts substantially in the same manner as when it was powered except that it is now relieved of many other stresses and vibrations experienced in a powered rotor. Directional control is also now provided by the aerodynamic rudders which are effective in the air stream and prop slip stream.

The anti-torque propellers add substantially to the efficiency of the aircraft and provide anti-torque correction, vertical supportive lift and directional control during the VTOL flight regime and then converts to a horizontal position to provide the most efficient and effective means of forward propulsion and maximum efficiency in the utilization of available horsepower.

In the VTOL configuration, the propellers provide all of their thrust for lift while still automatically compensating for the rotor torque and any variance in torque than occurs. The props are constructed to provide the best static lift possible and entirely absorb the available horsepower in converted flight at maximum velocity. In VTOL configuration, the props receive only a portion of the available horsepower with the rotor receiving the greater part since it provides the more efficient lift in the circumstances. The anti-torque propellers may be constructed of the variable pitch type so that a most efficient pitch can be used for vertical lift or horizontal flight rather than employing a compromised type of propeller of fixed pitch for both vertical flight and horizontal flight.

The use of propellers as the means of propulsion permits the rotor to be disengaged from the power train leaving it free to auto-gyrate and provide lift much in the same manner as a fixed wing aircraft during horizontal flight. This frees the rotor of the extreme structural problems associated with powered rotors and permits the use of a relatively simple type hub and compensating system. This type of hub is quite adequate for powered, slow VTOL flight to the point of conversion and need not endure the stresses that high speed would impose upon it if were powered. Disengaged, the floating rotor can tolerate stresses equal to the best of other systems. Thus, this convertible system permits a simpler, less complicated, more efficient hub and blade assembly with longer blade, hub and bearing life. Also, this system has less vibration, permits level flight attitude and instrument flight and much higher speeds without mechanical complications.

With the foregoing explanation of the conventional helicopter and comparison of the present invention therewith, it will be apparent that the present structure has many significant advantages as enumerated, as follows:

(1) Rotor has no need of cyclic pitch.
(2) Rotor has no need of collective pitch.
(3) Rotor hub has no need of lead or lag hinges.
(4) Rotor hub has no need for individual vertical flapping hinges.
(5) Rotor hub has no lubrication problems.
(6) Rotor hub has no bearing problems.
(7) Rotor hub is of simplest possible configuration.
(8) Four bladed rotor hub keeps rotor size minimum.
(9) Four bladed rotor increases vibration frequency, lessens beating.
(10) Rotor automatically compensates for all induced imbalances.
(11) Free teeter principle accepts and neutralizes momentary imbalances without pilot action.
(12) Floating rotor automatically cancels dissymmetry of lift without cyclic pitch.
(13) Floating rotor permits directional control without cyclic collective pitch control.
(14) The rotor hub eliminates Coriolis forces.
(15) The floating rotor relieves blades of high stresses in both powered and unpowered flight.
(16) The floating rotor concept permits use of fixed blades.
(17) Stall and zero lift occur simultaneously on opposing lateral blades.
(18) Control actions are gentler.
(19) Blades can be parallel for storage.
(20) Rotor is self-correcting for gyroscopic forces.
(21) Rotor's rapid response and the low frequency pendulum effect of the cross center of gravity damps out feeling of momentary rotor imbalances.
(22) Rotor system has greater lines of control at high speed.
(23) Craft has slower auto-rotational descent and flareout.
(24) Floating rotor concept permits rotor blades to operate at optimum angle of attack and lift-drag ratio.
(25) Lateral flapping due to lift dissymmetry is cancelled out by the very control action that induces the direction of flight and lateral flapping.
(26) Anti-rotor torque is 100% supporting lift.
(27) Torque correction is automatic, that is, anti-torque thrust automatically equal rotor torque.
(28) The exact amount of torque correction is automatically and smoothly introduced or removed by the automatic conversion system.
(29) The anti-torque control is engaged and disengaged to the aerodynamic rudder control automatically with conversion.
(30) Torque correction is stable, uneffected by gusts, control changes or changes in power setting and requires no pilot action.
(31) The propellers have multiple uses, namely, rotor torque correction, supportive lift, rotational control and prime means of forward propulsion.
(32) Conversion from one flight regime to the other is automatic and stable without the use of complex control systems.
(33) The propeller system permits the rotor to be unpowered, and thereby relieved of high stresses in flight.
(34) The system provides most efficient means of forward propulsion.
(35) It is not necessary to tilt the main rotor to compensate for lateral anti-torque thrust.
(36) No torque correction require in forward flight.
(37) All horse power used generates either supportive thrust or propulsion.
(38) No parasite drag from a tail boom and tail rotor.
(39) Propeller system permits stable level flight attitudes.
(40) Propeller system permits aircraft to handle and feel like a conventional aircraft.
(41) No powering of a tail rotor is necessary in emergency auto-rotational descent.
(42) An aerodynamic rudder and rotational control utilizing a common control system.
(43) The thrust of the props in vertical position is made more efficient by velocity of incident air imparted by the rotor.
(44) Props enhance rotor's efficiency in a normally poor lift area.
(45) Props remove vortex ring permitting faster safe descent.
(46) Position of propellers in normal flight position help rotor auto-gyrate by drawing air under the blades.
(47) Propulsion by props rather than rotor relieves the rotor blades of the necessity of high cyclic angles of attack, resulting in greater rotor efficiency and less profile drag.

(48) Props permit higher speed potential.

(49) Contra-rotating props eliminate rolling torque from propeller torque.

In resume of the foregoing, the aircraft of the present invention will be safe to operate, efficient and is quite versatile in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a schematic perspective view illustrating the drive arrangement and associated supportive structure;

FIGURE 6 is a group perspective view illustrating the structure of the central connecting element for oppositely disposed blades of the rotor and illustrating the underslung construction thereof;

FIGURE 7 is a plan view of the construction of FIGURE 5;

Figure 1:
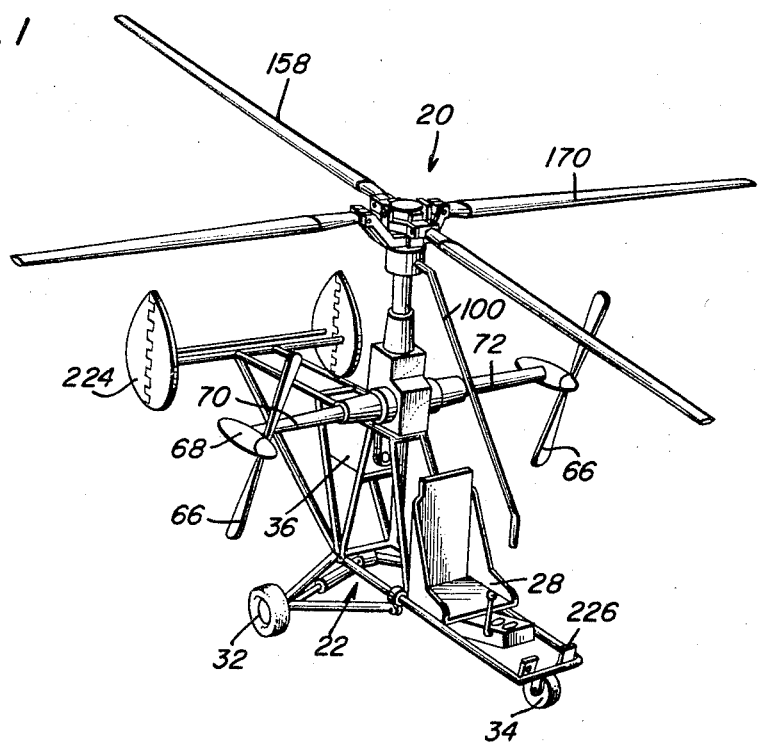
FIGURE 1 is a perspective view of the aircraft of the present invention illustrating a rather simplified version thereof.

Referring now specifically to the drawings, the numeral 20 generally designates the embodiment of the aircraft illustrated in FIGS. 1–9 with various of the structural features of the aircraft being schematically illustrated where the details are not deemed necessary for an understanding of the invention.

As illustrated, the aircraft 20 includes a fuselage 22 which as illustrated may be of skeleton construction and which is provided with the rearwardly extending tail portion 24 and a forwardly extending occupant receiving portion 26 having a seat 28 mounted thereon for receiving an occupant 30 in the form of a pilot. The structure of the fuselage may be skeletonized as illustrated or provided with any suitable covering and may include tubular elements secured together in any particular manner and having sufficient strength and rigidity to comply with the requirements of the particular structure involved. The aircraft 20 is provided with landing gear in the form of wheels 32 including a nose wheel 34 which may be steerably controlled if desired. Also, disposed in the fuselage 22 is a prime mover or engine 36 may be of any suitable type such as an internal combustion piston-type engine, a turbine or of any suitable construction with the edges having a power output assembly which may be connected to a power shaft 38 in any suitable manner such as by a belt drive 40, a chain drive, gear drive or any other suitable connection including a direct drive shaft or the like.

The power thus is transferred to the shaft 38 to a drive shaft 42 through a pinion gear 44 on the end of the input shaft 38 and a large ring gear 46 on the lower end of the drive shaft 42. The drive shaft 42 includes an upper drive shaft section designated by numeral 48 which is releasably connected with the lower section of the drive shaft 42 by a hydraulic type clutch 50 which drivingly connects shafts 42 and 48. In addition to the hydraulic clutch 50, there is provided a one-way clutch 52 of any suitable type which permits the lower shaft 42 to drive the upper shaft in one direction but the upper shaft 48 is free to rotate unrestrained if the lower shaft 42 stops driving or is disengaged by the hydraulic clutch 50.

Figure 3:
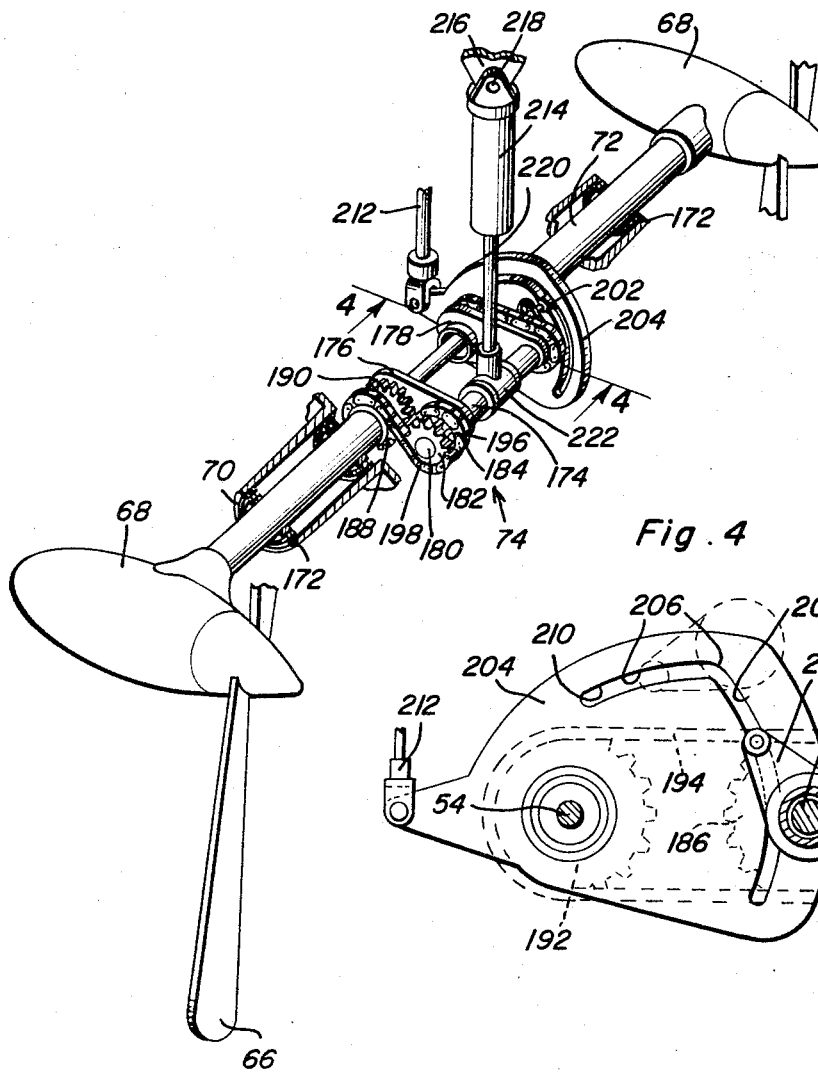
FIGURE 3 is a fragmental perspective view illustrating the control assembly for varying the position of the anti-torque propellers.

A transversely extending cross propeller shaft 54 intersects the ring gear 46 and a pinion gear 56 on the shaft 54 is in driving engagement with the ring gear 46. The outer ends of the shaft 54 are provided with pinion gears 58 in meshing engagement with ring gears 60 that are fixed to propeller shafts 62 having a hub 64 thereon for attachment of contra-rotating propellers 66 for rotation thereof in opposite directions. The drive structure for each propeller 66 is enclosed within a nacelle 68 with the two nacelles 68 being fixedly secured to elongated housings or hollow shafts 70 and 72 which are concentric with the shaft 54 as illustrated in FIGURE 3 for connection with a differential control system generally designated by numeral 74.

Figure 9:
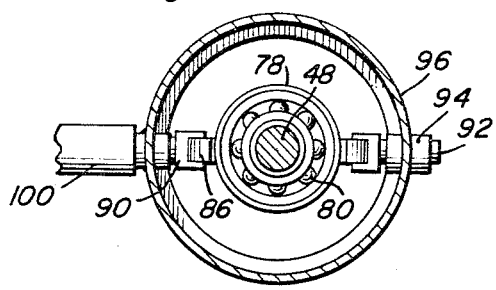
FIGURE 9 is a plan sectional view taken substantially upon a plane passing along section line 9—9 of FIGURE 8.
Figure 10:
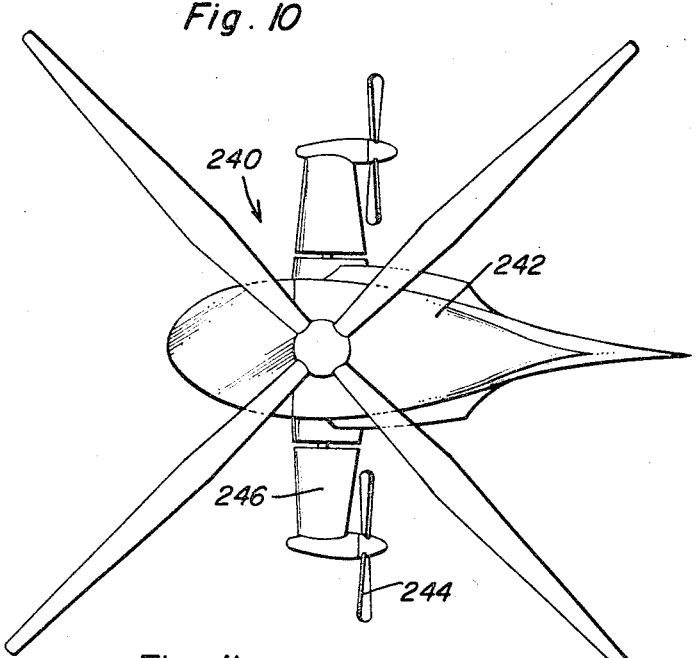
FIGURE 10 is a plan view of another embodiment of the present invention.

The upper end of the shaft 48 is connected with a hub and control assembly generally designated by the numeral 76 which is illustrated in more detail in FIGURES 5–9. The upper end of the drive shaft 48 is disposed within a tubular main support post 78 that is supported from the fuselage in any suitable manner and extending up through the post 78 is the drive shaft 48 that is journalled in the upper end thereof by a suitable bearing assembly 80 such as a ball-type bearing assembly which may conveniently be a thrust-type ball bearing assembly having a ring 82 engaging the upper surface thereof and received in a groove 84 in the drive shaft 48. The exterior surface of the support post and drive shaft housing 78 is provided with a pair of diametrically opposed arcuate guide blocks 86 which have a virtual center coincident with the center of the drive shaft 48. The guide radius blocks are secured to the post 78 by any suitable fasteners 88. Each of the guide radius blocks is provided with a gliding or movable female radius block 90 in the form of a shoe of channel-shaped configuration as illustrated in FIG. 9 for arcuate sliding movement against the male blocks 86. Projecting outwardly from each of the female radius blocks 90 is a pin 92 which is received within a bushing and spacer 94 which extends outwardly through and is rigidly affixed to a relative short swabble tube 96. One of the bushings or spacers 94 is received within a socket 98 in an elongated and angular control stick 100 which extends downwardly in front of the occupant and is provided with a handle 102 at the lower end thereof for controlling the position of the control stick thus controlling the angular position of the swabble tube 96 as guided by the female guide radius blocks 90 moving in arcuate manner along the arcuate periphery of the male radius blocks 86.

The lower end of the swabble tube 96 is provided with an inwardly extending flange 104 defining an enlarged opening 106 therein in encircling relation to the housing 78 to enable pivoting movement of the swabble plate 96 about the virtual center of the arcuate surfaces of the guide blocks 86. Also, the swabble tube 96 is capable of being journalled on the pins 92 inasmuch as the bushings or spacers 94 are journalled thereon.

The upper end of the swabble tube 96 is provided with an inwardly extending flange 108 defining an enlarged opening 110 which encircles in spaced relation an upwardly extending control tube 112 which also is concentric with the drive shaft 48 and the lower end of the control tube 112 is spaced above the upper end of the support post 78. Mounted on the lower end of the control tube 112 is a bearing assembly 114 such as a ball-type thrust bearing in which the inner race may be fixedly secured to the control tube 112 and the outer race received within the inner channel 116 of a control ring 118. The control ring 118 has four radially extending pins 120 which are equally spaced around the periphery of the ring 118 and each of the pins 120 has an antifriction tubular roller 122 journalled and retained in position thereon by any suitable retainer 124. The anti-friction rollers 122 extend out through vertical slots 126 in the swabble tube 96 with the vertical dimension of the slots 126 limiting relative movement between the swabble tube 96 and control tube 112 and the pins 120 and slots 126 are arranged in 90° spaced relation to each other.

The upper end of the control tube 112 is provided with a flange 128 which is attached to a constant velocity universal joint assembly 130. The universal joint 130 includes an inner race 132 that is keyed or splined to the upper end of the drive shaft 48 in a conventional manner and retained in position thereon by a retaining nut 134 or the like. Concentric with the inner race 132 is an outer race 136 with a plurality of balls 138 disposed between the the arcuate surfaces thereof and retained in position by a suitable cage 140. The center of rotation of the universal joint including the arcuate configuration of the inner race and outer race is at the center of the drive shaft 48. Also, the outer race 136 has radially extending pins 142 thereon which are orientated at 90° in relation to each other and also intersect the same center of rotation coincident with the center of rotation of the universal joint. This type of universal joint is known as constant velocity universal joint and is one in which the outer race 136 can be tilted about a virtual center, located at the exact center of the joint while maintaining a constant velocity relation between the drive shaft 48 and the tiltable outer race 136. The control tube 112 which is bolted to the outer race 136 provides a lever with which the outer race 136 and attacher rotor hinge pins 142 can be tilted about the geometric center of the universal joint. The bearing 114 between the control tube 112 and the control ring 118 permits the control ring 118 and the pins 120 to be retained in the slots 126 provided in the swabble tube 96 without rotation while the control tube 112 itself is free to rotate with the universal joint 130. The female radius blocks 90 and the male radius blocks 86 permit the swabble tube 96 to pivot fore and aft about the radius of a geometric center half-way between the blocks. The swabble tube 96 is also free to tilt from side to side about the same geometric center since the pins 92 about which the swabble tube can rotate also always pass through this geometric center. Thus, when the control stick 100 is moved forward and aft, the swabble tube 96 is rotated about the radius guide blocks. When the control stick 100 is moved from side-to-side the swabble tube 96 pivots about the pins 92 on the outer radius blocks 90, the axis of rotation of which also passes through the same geometric center. Since the control pins 120 on the control tube 112 are confined in the slots 126 of the swabble tube 96 and are unable to rotate, any directional movement of the control stick and the attached swabble tube 96 is mechanically translated to the control pins 120 thus forcing the control tube 112 in that direction which is the correct "direction" for the control of flight.

While this particular control system is one method of controlling the hub assembly, it is pointed out that other types of conventional swabble plate arrangements may be also employed for accomplishing this purpose. Any constant velocity universal joint could also be substituted for the universal joint 130 illustrated as long as the geometry of its pivoting movement remains the same.

Mounted on the pins 142 on the outer race 136 of the universal joint 130 is a pair of rotor hubs 144 and 146. The rotor hub 144 includes a pair of strap-like side members 148 which have the center portions thereof offset outwardly and provided with upstanding brackets 150 having openings 152 therein engaging one pair of pins 142. The outer ends of the side members are provided with blocks 154 which space the ends of the side members 148 apart and receive and retain the blade spar pins 156 therein in a rigid manner with the blade spars 158 being fixed to the pins 156 in a conventional manner. The other rotor hub 146 is substantially the same in that it includes side members 160 having the central portions thereof offset downwardly and provided with brackets 162 having apertures 164 therein for receiving the other pair of hinge pins 142. The remote ends of the side members 160 receive blocks 166 therein which fix the blade spar pins 168 in position with each blade spar 170 being fixed to a pin 168 in a conventional manner. The relationship of the hubs 144 and 146 and the coplanar relationship of pins 156 and 168 as well as the spars 158 and 170 are illustrated in FIGS. 5–7 and serves to enable limited floating or tilting of the blades about the hinge pins 142. The underslung arrangement of the blade pivot allows the blades to cone normally and still keep the rotor disk center of gravity plane in the same plane as the geometric center of rotation and this factor remains true for both blades through most of the flight regime. The plane of the rotor disk center of gravity coincides with the blade's pivot point so that no radial forces are involved other than centrifugal forces thus retaining the rotor stable. When the outer race of the universal joint is tilted by the controls, the blades flap momentarily and then stabilize in the plane of rotation of the inclined hub. The center of gravity of the rotor disk still passes through the geometric center of rotation thus eliminating Coriolis lead and lag forces in the blades and curtails a great deal of vibration due to radial loading. Inasmuch as the center of gravity of the craft is not aligned with the center line of thrust from the rotor when the controls are tilted forwardly, varying the forward vector of thrust imparted to the craft.

Figure 4:
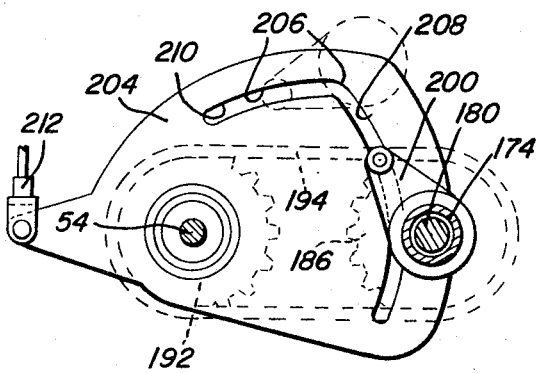
FIGURE 4 is a sectional view taken substantially upon a plane passing along section line 4—4 of FIG. 3.
Figure 8:
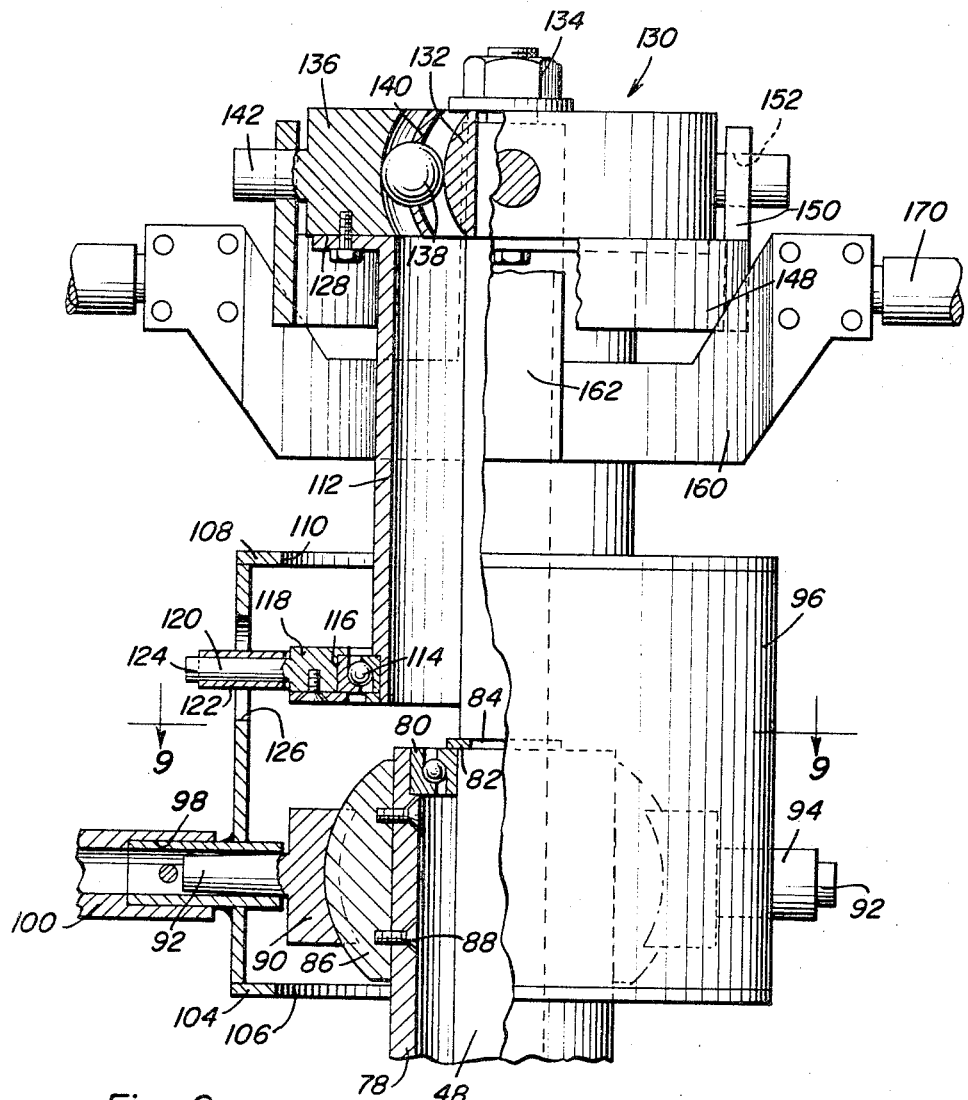
FIGURE 8 is a partial sectional view of the rotor hub assembly.

The adjacent ends of the nacelle support and control tubes 70 and 72 are journalled by suitable bearings 172 in a gear box housing (not shown in FIGS. 3 and 4). As illustrated, the cross-shaft 54 is journalled in the housings 70 and 72 and the tubes 70 and 72 are rotated in their bearing mounts with the center of the cross propeller shaft 54 being the center of rotation thereby maintaining proper gear meshing in the nacelles 68.

Fixed rigidly to a hollow torque tube 174 is a pair of differential yoke arms 176 and 178 and the tubes 70 and 72 pass through the ends of the yoke arms 176 and 178 with the yoke arms 176 and 178 being pivotally mounted and supported by the end portions of the tubes or housings 70 and 72. A solid torque bar or rod 180 runs through and is journalled for rotation in the hollow torque tube 174. Mounted on the end of solid rod or bar 180 are three sprocket gears 182, 184 and 186. Each of the sprockets are of the same size, pitch and number of teeth and are all rigidly attached to the torque bar 180. Larger sprocket gears 188, 190 and 192 are aligned with the sprocket gears 182, 184 and 186 and are also of the same size, pitch and number of teeth but all are larger than the gears mounted on the torque bar 180. The sprocket gears 188 and 190 are rigidly fixed to the support tube 70 and sprocket gear 192 is rigidly fixed to the support tube 72.

A roller chain 194 passes around sprocket gears 186 and 192 in an encircling manner as illustrated in FIG. 4. A roller chain 196 is pinned to the sprocket 184, passes over the sprocket 184 and then under the sprocket 190 and pinned to the sprocket 190. A similar roller chain 198 is pinned to the gear 182, passes under the gear 182, over the sprocket gear 188 and is pinned to the sprocket gear 188 as illustrated in FIG. 3. By employing this arrangement, the support tube 72 will rotate in the same direction as torque bar 180 since the chain 194 encircles the sprocket gears 186 and 192 and the support tube 70 will rotate in the opposite direction as the torque bar 180 when it is rotated in view of the manner in which the sprocket chains 196 and 198 are connected with the pairs of aligned gears.

Disposed between the hollow tube 174 and the torque bar 180 are eccentric bushing arrangements which can be adjusted to move the torque bar 180 closer to or away from the tubes 70 and 72 to permit exact chain tension and removal of slack while keeping the shafts parallel. Inasmuch as the eccentric bushing arrangement is conventional in many structural arrangements, the details thereof are not disclosed and are not important to the present invention except that it is necessary to provide some structure for retaining the chains taut and to remove any slack therein which may occur.

The end of the torque bar 180 which has the gear 186 mounted thereon is provided with a crank arm 200 rigidly affixed thereto which has a roller 202 mounted thereon in the form of a cam follower. A rudder control cam plate 204 is mounted on the tube 72 and is journalled thereon to rotate freely about the axis of the tube 72. A precisely plotted cam slot 206 is formed in the rudder control cam plate 204 and the cam roller follower 202 is received in the slot 206.

The cam slot 206 has two distinct portions including a portion 208 which defines a radius about the center point of rotation of the cam plate 204, tube 72 and cross shaft 54. The portion 210 of the cam slot 206 has a radius to provide a control function to be described hereinafter.

When the cam plate 204 is in place and the cam follower roller 202 is in the slot 206, the cam roller 202 cannot slip laterally out of the slot without disassembly. A rudder control lever 212 is connected to a laterally projecting portion of the cam plate 204 and is operative in response to the operation of the rudder control. Thus, by operating the rudder controls to which the rudder control lever 212 is connected, the control cam plate 204 can be rotated about its pivot support tube 72.

Attached to the center of the torque tube 174 is a linear actuator 214 having one end thereof pivotally anchored to a support element 216 by a pivot pin or bolt 218 and having an actuator rod 220 extending from the other end thereof and connected to the torque tube 174 by the use of a sleeve 222. The actuator 214 may be a hydraulic or an electric linear actuator and is reversible and contains travel limit switches and may be of conventional construction.

The automatic differential control system 74 has two basic flight positions. During the normal flight regime, the nacelles 68 are in the down position generally parallel to the ground surface in substantially the same horizontal plane and the actuator 214 is in extended position and the cam follower 202 is in the portion 208 of the cam slot 206. The rudder controls have no effect on the differential or the nacelles.

Figure 2:
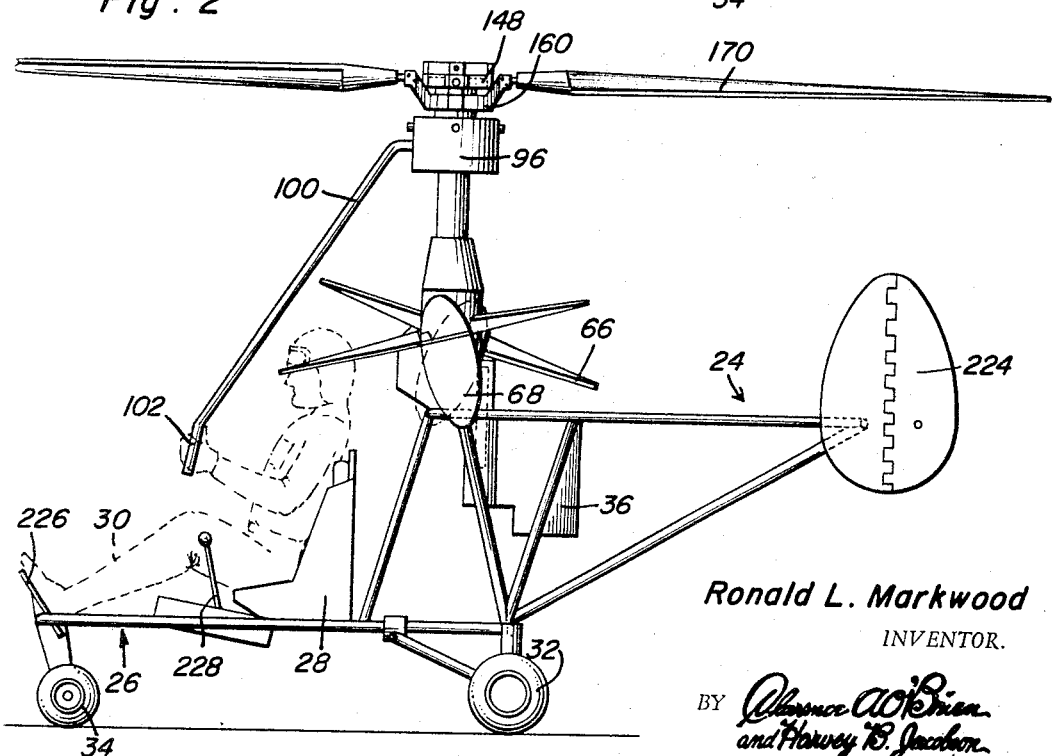
FIGURE 2 is a side elevational view of the construction of FIGURE 1 illustrating the propellers in their anti-torque and vertical lift position.

During a VTOL flight regime, the nacelles 68 are in the vertical or up position and slightly inclined in opposite directions for rotor torque correction. The actuator 214 is in the retracted position and the cam follower 202 is in the portion 210 of the cam slot 206. Use of the rudder controls in this condition then results in simultaneous rudder movement and angular increase or decrease of nacelle tilt angle, thereby increasing or decreasing torque correction factor. The rudders are illustrated in FIGS. 1 and 2 and are designated by numeral 224 and the rudders may be controlled by a foot pedal 226 or the like with suitable mechanism interconnecting the foot pedal and the rudder 224 and also connecting the rudder control linkage 212 thereto.

In the sequence of action from normal flight regime to VTOL starting with the nacelles in the down or horizontal position, the conversion sequence is initiated by the pilot 30 closing the switch such as at 228 to energize linear actuator 214. As the actuator 214 retracts, it forces the torque tube 174 and affixed yoke arms 176 and 178 to rotate upward about tubes 70 and 72 upon which they pivot. Since the cam follower 202 is in the portion 208 of the slot 206 which is also on a radius about the center of tube 72, the cam arm 200 travels parallel to the rotation of the differential yoke formed by the torque tube 174 and yoke arms 176 and 178 and torque bar 180 does not and cannot rotate in relation to torque tube 174 inasmuch as all components are rotating about a common axis. Movement of the rudder control 212 and connected cam plate 204, therefore, will have no effect on the cam follower 202, cam arm 200 or differential yoke when the follower 204 is in any part of the portion 208 of the cam slot 206. However, the sprocket 186 being affixed rigidly to torque bar 180 and the sprocket gear 192 being fixed rigidly to tube 72 and the two sprockets are roller chained together thus, tube 72 and the nacelle 68 connected thereto is forced to rotate with it in the same direction as the differential yoke is forced upward by the actuator 214. Sprockets 182 and 184 are rigidly affixed to the torque bar 180 and sprockets 188 and 190 are rigidly affixed to tube 70 and since these sprockets are roller chained together in a figure-8 fashion, the upward rotation of the differential yoke with the cam follower in the portion 208 of the cam slot 206 forces the tube 70 to also rotate at the same rate as the tube 72 and in the same direction as the differential yoke. While the cam follower 202 is in the same portion 208 of the slot 206, the rudder control 212 can be moved freely and the connected cam plate 204 accordingly rotated without effecting parallelism of the nacelles 68 as they simultaneously rotate upward. As the linear actuator 214 nears its full retraction, bringing the nacelles close to vertical position, the cam follower 202 then comes to the juncture between the cam slot portions 208 and 210 and is capable of entering the portion 210 of the cam slot 206. As the follower 202 is forced to move forward by the inclined slot as the linear actuator 214 is further retracted toward its limit of movement, the torque bar 180 is forced by the cam lever arm 200 which is rigidly affixed thereto to rotate in the torque tube 174. At this time, the tube 72 which is chain connected to the torque bar 180 is forced to rotate a prescribed number of degrees in the same direction of rotation. However, tube 70 which has the figure-8 chain connection with the torque bar 180 forces the tube 70 to rotate the same prescribed number of degrees but in the opposite direction as torque bar 180. Therefore, as the end of the actuator travel takes place, the cam follower 202 acting against the portion 210 of the cam slot 206 forces the torque bar 180 to rotate and transfer this rotation by chain connection to tubes 70 and 72 with this rotation being opposite and equal for the tubes 70 and 72 and the attached nacelles 68. Thus the angle of nacelle tilt achieved is a function of the portion 210 of the cam slot 206 and the lever or distances involved. This nacelle tilt angle is designed to exactly counter the rotor torque produced by angling the two propeller thrust in an anti-torque direction. In this VTOL regime, position, movement of the aerodynamic rudder controls also rotates the mechanically connected cam plate 204 and now that the cam follower is in the portion 210 of the cam slot 206, rotation of the cam plate 204 forces the cam follower 202, cam arm 200 and torque bar 180 to rotate in one or the other direction. This, in turn, rotates tubes 70 and 72 and nacelles 68 respectively in opposite directions thereby adding or substracting from their angle of tilt. This permits an excess of anti-torque correction to be added until a positive rotational force greater than the rotor torque is achieved, causing rotation of the craft in that direction, or it allows anti-torque correction to be withdrawn from the resultant rotation in the direction of the now positive rotor torque.

The precise neutralizing torque angle assumed by the nacelles 68 in VTOL configuration has been calculated to precisely cancel rotor torque regardless of the power setting of flight conditions unless purposely overpowered by the differential system for directional control. As the rotor gains in lift and drag, and therefore torque, the props also increase in anti-torque thrust in the same proportion thus equalizing the torque created. Torque discrepancies introduced when slipping the clutch are overcome by increasing or decreasing the anti-torque force via the differential system.

The mechanical arrangement of the cam and automatic differential control is specifically constructed to keep the system free of torque forces that can be felt by the pilot in the controls without losing the "feel" of the aircraft as occurs in hydraulic and irreversible gearing. The high rotational torque transferred to tubes 70 and 72 by the horsepower transmitter through the right angle nacelle gears is in the same direction for both nacelles. Since both tubes 70 and 72 and torque bar 180 are rigidly connected by the roller chains and sprockets, they essentially act as a single tube with rotational torque in one direction. This rotational torque in one direction is entirely bucked by the electrical linear actuator whose compression and tension load ability far exceeds any torque involved. The actuator with limit switches also provides an adjustable positive stop and includes a low ratio worm gear mechanism which is irreversible without purposely energizing the actuator. Torque forces are also absent in the differential control which is engaged in VTOL regime with the rudder controls. This is possible because as one support tube is rotated in the direction of the torque, the other tube is rotated against the torque, the two thereby cancelling each other out. This system permits the pilot to operate the rudder pedals, and lessen or increase the anti-torque tilt angle of the nacelle while they transfer full horsepower without feeling any of the torque in the controls.

The rotor blades may be stored in a hanger or the like by having the hinge pins for one of the rotor hubs in the form of removable bolts, pins or the like or the rotor hubs may be constructed of two pieces so that they can be unbolted and separated along a vertical parting line along the blade axis which also permits the rotor blade spars to be entrapped in the solid ends of the hubs leaving the center portion of the hub open as illustrated. Also, a single blade assembly can be used as well as the crossed pairs of blades or spars as illustrated.

It is pointed out that the anti-torque propeller system can be used with other or conventional rotor systems and can be either of the pusher type or puller type with positive, zero or negative dihedral or swept forward, extended at right angles or swept backward so long as their anti-torque thrust lines are equal and opposite and act along the center of gravity line of the craft and rotor when they are in the vertical anti-torque position.

The embodiment of the invention illustrated in FIGS. 10–13 generally designated by numeral 240 illustrates a type of fuselage 242 which may be employed and also illustrates pusher type propellers 244 which are mounted at the outer end of relatively short stubby wings 246 which rotate with and are affixed to the nacelles associated with the props 244. The wings 246, since they pivot with the nacelles, will always be presented to the propeller and rotor downwash in the least drag orientation. Vertically positioned when the rotor and props are lifting for slow vertical flight and horizontally positioned when the props are converted for forward horizontal flight. The wings 246 add increasingly more lift as the craft's speed increases, unloading the rotor and restoring lift lost by tip stall or the rotor blades, thereby, extending the top speed of the craft beyond the limits of the rotor. The wings 246 add to the anti-torque correction of the props in the vertical position by the pressure of the rotor downwash on their angled surfaces. Also, by including a means whereby the wings' angles of attack can be optionally trimmed by the pilot to higher angles of attack about the nacelle support tubes without rotating the tubes during horizontal flight the craft can shorten its STOL take-off run, use the wings as flaps to slow the rate of descent during normal or emergency auto-rotational landings, and further unload the rotor in converted horizontal flight by selectively increasing the wings' angles of attack.

It is also pointed out that the anti-torque prop system can be operated by means other than the conversion system disclosed and the chain linkage type of conversion system could be replaced by gears, bands, levers and the like as long as the same action is accomplished. The hydraulic clutch and the function thereof is quite important to the function of the aircraft and is believed to be novel. During take-off and landing, the engine is operated at full power and the anti-torque props provide their full degree of lift. The clutch, which is capable of constant torque transmission while increasing or decreasing r.p.m. of the output shaft, permits the rotor speed to be varied at will. Since the rotor is not the only lift supplied, it lessens the sensitivity of the rotor r.p.m. in control of ascent or descent. The difference in rotor r.p.m. between the conditions of a slow descent, hover and slow ascent is a matter of a very few r.p.m.'s. The engine operating at high r.p.m. acts somewhat as a sump of power that can be drawn on immediately without fear of lugging the engine, thereby permitting rapid response of the rotor r.p.m. by use of the clutch only. The hydraulic clutch being used is a wet oil shear clutch which permits literal riding of the clutch in ascent or descent similar to the conventional collective pitch. The clutch is, therefore, an essential feature of the control of the power floating system in ascent or descent.

One of the features of the invention is the combined use of a free flapping rotor blade assembly or flapping axis of the blades always lying in the same plane as the geometric point about which the hub can tilt. This configuration permits free flapping of the blade assemblies to cancel or absorb momentary imbalances, such as, gyroscopic forces, Coriolis forces, aerodynamic forces and lift dissymmetries. The tilting of the hub, however, accomplishes two things: (1) it provides the craft with a horizontal force vector, thereby propelling it in the direction of the hub tilt, and (2) the tilting of the hub and affixed blade axis simultaneously introduces the correct pitch changes to both advancing and retreating blades to cancel the flapping due to the dissymmetry of lift which would normally occur when the craft moves through the air in the direction of the hub tilt.

Figure 11:
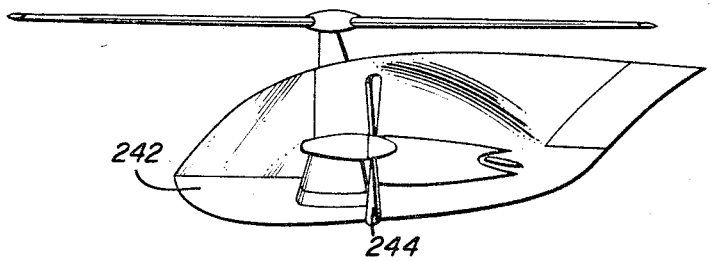
FIGURE 11 is a side elevational view of the construction of FIGURE 10.
Figure 12:
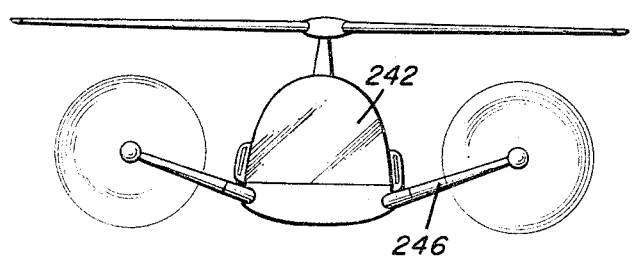
FIGURE 12 is a front view of the construction of FIGURES 10 and 11 illustrating the device with the propellers in horizontal attitude.
Figure 13:
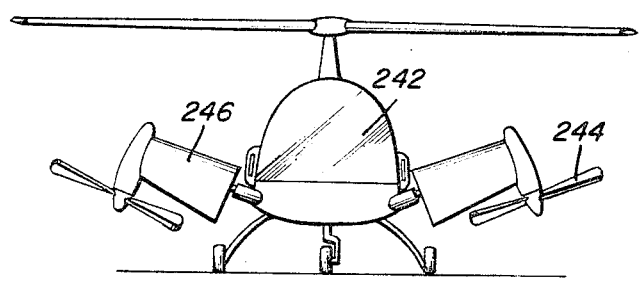
FIGURE 13 is a front view similar to FIGURE 12 but illustrating the propellers in their vertical anti-torque and supportive lift position.

As will be apparent from FIGURES 10–13, the structure of the aircraft enables the fuselage to be constructed in various manners much more adaptable for carrying a multiple of occupants or other load inasmuch as it is no longer necessary to provide an elongated fuselage so that the tail rotor may be oriented rearwardly of the rotor. Also, a single rudder may be provided if desired and the position of the propellers may be such that the inclined plane of rotation will intersect below the fuselage when the VTOL position and oriented rearwardly of the passenger compartment when in the converted flight position as illustrated in FIG. 11 thus reducing the possibility of injury from a propeller. The specific details of the controls have not been illustrated inasmuch as they will vary depending upon each individual aircraft and suitable landing gear either of the stationary or retractible type may be employed and various types of landing gear may be employed such as floats, skis, wheels and the like.

What is claimed as new is as follows:

1. A convertible aircraft comprising a mobile body, a rotor disposed above the body and rotatably supported therefrom for rotation about substantially a vertical axis, means supported from the body for driving the rotor, control means associated with the body for angulating the axis of rotation of the rotor in relation to the center of gravity of the body, a pair of propeller means supported from the body and arranged on opposite longitudinal sides thereof, means on the body for driving the propeller means, and means pivoting the axis of rotation of the pair of propeller means and maintaining said axes of rotation coplanar from a substantially horizontal position to a substantially vertical position and further pivoting means for orienting the axes of rotation of the propeller means in oppositely inclined relation when in the vertical position for counteracting torque exerted on the body by driving the rotor.

2. The structure as defined in claim 1 wherein said rotor includes radially extending blades with oppositely disposed blades being rigidly interconnected in crossed pairs with the blades of the crossed pairs being coplanar and each rigid cross pair of blades capable of limited flapping movement in relation to the other crossed pairs of blades.

3. The structure as defined in claim 2 wherein said rotor includes a hub assembly connecting the blades to a drive shaft, a prime mover for driving said drive shaft, clutch means in the drive shaft for selectively driving the rotor and allowing auto-rotation thereof.

4. A convertible aircraft comprising a mobile body, a rotor disposed above the body and rotatably supported therefrom for rotation about substantially a vertical axis, means supported from the body for driving the rotor, control means associated with the body for angulating the axis of rotation of the rotor in relation to the center of gravity of the body, a pair of propeller means supported from the body and arranged on opposite sides thereof, means on the body for driving the propeller means, and means pivoting the axis of rotation of the propeller means from a substantially horizontal position to a substantially vertical position and orienting the axes of rotation of the propeller means in oppositely inclined relation when in the vertical position for counteracting torque exerted on the body by driving the rotor, said rotor including radially extending blades with oppositely disposed blades being rigidly interconnected in crossed pairs capable of limited flapping movement in relation to each other, said rotor including a hub assembly connecting the blades to a drive shaft, a prime mover for driving said drive shaft, clutch means in the drive shaft for selectively driving the rotor and allowing auto-rotation thereof, said hub assembly including a constant velocity universal joint, said pairs of blades being pivotally connected to the outer race of the universal joint, said control means including an operating device operatively associated with the outer race of the universal joint to tilt the outer race for varying the axis of rotation of the blades.

5. The structure as defined in claim 4 wherein a single drive means is provided for the rotor and propeller means, the propeller means on each side of the body being drivingly interconnected for simultaneous rotation in opposite directions.

6. The structure as defined in claim 5 wherein said body includes rudder means, control means for said rudder means, said rudder control means being operatively associated with the means controlling the angular position of the propeller means for enabling interrelated control of the rudder means and propeller means.

7. The structure as defined in claim 6 wherein said means pivoting the axis of rotation of the propeller means includes a pair of housing tubes journalling the propeller means on the outer ends thereof, and means connected to the housing tubes for rotating the housing tubes in opposite directions to each other.

8. The structure as defined in claim 7 wherein said means for rotating the housing tubes includes a drive connection with each of said tubes, one of said drive connections turning one tube in reverse direction to the other tube.

9. A convertible aircraft comprising a mobile body, a rotor disposed above the body and rotatably supported therefrom for rotation about substantially a vertical axis, means supported from the body for driving the rotor, means associated with the body for angulating the axis of rotation of the rotor in relation to the center of gravity of the body, a pair of propeller means supported from the body and arranged on opposite sides thereof, means on the body for driving the propeller means, and means pivoting the axis of rotation of the propeller means from a substantially horizontal position to a substantially vertical position and orienting the axes of rotation of the propeller means in oppositely inclined relation when in the vertical position for counteracting torque exerted on the body by driving the rotor, said means for angulating the axis of rotation of the rotor including a control stick extending to a position for control by a pilot, a constant velocity universal joint supporting the rotor, said control stick being operatively connected with the outer race of said universal joint.

10. The structure as defined in claim 9 wherein said outer race includes a depending control tube fixed thereto, and a swabble tube operatively connected to the control tube to angulate the control tube when the swabble tube is tilted.

11. The structure as defined in claim 1 together with a pair of short stubby wings on opposite sides of the body and having the propeller means connected therewith for pivotal movement therewith for presenting the least possible drag to the rotor and propeller means downwash, increasing lift on the body as speed increases, increasing anti-torque correction of the propeller means when in their vertical position and unloading the rotor and restoring lift lost due to tip stall of the rotor blades.

12. The structure as defined in claim 11 wherein said wings are constructed to vary the angle of attack thereof.

13. In a heavier-than-air craft of the type having a body and a rotor means carried thereby for rotation about a substantially vertical axis, that improvement comprising an anti-torque system including a pair of propeller means supported from the body and arranged on opposite longitudinal sides thereof, means on the body for driving said propeller means, and means for simultaneously orienting the axes of rotation of the propeller means while maintaining them coplanar from a horizontal position to a vertical position and further orienting means for orienting the propeller means in opposite inclined relation when in the vertical position to counteract torque exerted on the body by said rotor means.

14. The structure as defined in claim 13 wherein said propeller means are interconnected to produce an equal thrust on opposite sides of the line of force exerted by the rotor means.

15. The structure as defined in claim 3 wherein said clutch means comprises a unidirectional clutch for driving or auto-rotation of the rotor and a gradual engagement clutch for pilot controlled slippage for variably controlling the r.p.m. of the rotor.

References Cited

UNITED STATES PATENTS

| | | | |
|---|---|---|---|
| 2,130,918 | 9/1938 | De Stefano | 244—17.19 |
| 2,487,020 | 11/1949 | Gilcrease | 170—135.24 |
| 3,080,002 | 3/1963 | Du Pont | 170—160.26 |

FOREIGN PATENTS

| | | |
|---|---|---|
| 133,944 | 8/1949 | Australia. |
| 871,050 | 6/1961 | Great Britain. |
| 895,590 | 5/1962 | Great Britain. |

MILTON BUCHLER, *Primary Examiner.*

T. W. BUCKMAN, *Assistant Examiner.*

U.S. Cl. X.R.

244—17.19, 17.25; 170—160.26